(12) United States Patent
Ono

(10) Patent No.: US 6,411,765 B1
(45) Date of Patent: Jun. 25, 2002

(54) OPTICAL WAVEGUIDE ELEMENT AND METHOD FOR MANUFACTURING OPTICAL WAVEGUIDE ELEMENT

(75) Inventor: Hideki Ono, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/533,737

(22) Filed: Mar. 23, 2000

(30) Foreign Application Priority Data

May 11, 1999 (JP) ............................................ 11-129997

(51) Int. Cl.[7] ........................... G02B 6/10; C03B 37/023
(52) U.S. Cl. ............................ 385/131; 385/14; 385/129; 385/130; 385/132; 385/39; 65/385; 65/386
(58) Field of Search ........................... 385/14, 129, 130, 385/131, 132, 141, 39; 65/385, 386

(56) References Cited

U.S. PATENT DOCUMENTS

| | | | |
|---|---|---|---|
| 5,163,118 A | * 11/1992 | Lorenzo et al. | 385/132 |
| 5,333,216 A | * 7/1994 | Sakata et al. | 385/28 |
| 5,432,872 A | * 7/1995 | Stewart et al. | 385/15 |
| 5,438,639 A | * 8/1995 | Ford et al. | 385/30 |
| 5,559,912 A | * 9/1996 | Agahi et al. | 385/42 |

FOREIGN PATENT DOCUMENTS

JP  7-20344  1/1995  ............... 385/14 X

* cited by examiner

*Primary Examiner*—Brian Healy
(74) *Attorney, Agent, or Firm*—Venable; Norman N. Kunitz

(57) ABSTRACT

According to the present invention, which provides a optical waveguide element achieving high performance and high yield, that makes it possible to form a complex light-wave circuit structure without requiring a larger mounting area and a optical waveguide element manufacturing method, a optical waveguide element 100 is provided with an Si substrate 102 and a first light-wave circuit layer 112 and a second light-wave circuit layer 120 sequentially laminated on the substrate 102. At the first light-wave circuit layer 112, a first optical waveguide structure constituted of a first clad layer 104 formed toward the substrate 102, a first core portion 108 and a second clad layer 110 formed toward the second light-wave circuit layer 120 is achieved. In addition, at the second light-wave circuit layer 120, a second optical waveguide structure constituted of a second core portion 116 and a third clad layer 118 at the second light-wave circuit layer 120 is achieved. Since the first light-wave circuit layer 112 and the second light-wave circuit layer 120 are directly laminated, a directional optical coupling is induced between the first core portion 108 and the second core portion 116.

12 Claims, 12 Drawing Sheets

100

200

200'

300

500

OPTICAL WAVEGUIDE ELEMENT AND METHOD FOR MANUFACTURING OPTICAL WAVEGUIDE ELEMENT

BACKGROUND OF THE INVENTION

1. Field of the Invention

The present invention relates to a optical waveguide element that may be employed in, for instance, optical communication and a method for manufacturing the optical waveguide element.

2. Description of the Related Art

Passive light-wave circuits are playing an increasingly crucial role in optical communication systems today. A wave guiding channel type light-wave circuit that achieves a high degree of stability and excellent mass productivity is considered to be an essential component in optical communication systems. In particular, quartz optical waveguides, which make the most of the physical and chemical stability of quartz glass, achieve advantages such as good conformity with optical fibers constituting transmission pathways and have been adopted in applications in PLCs (planar light-wave circuits) having complex and advanced functions to enable control of light phases and interference, and intense research and development efforts have been made in this area.

FIG. 11 illustrates a schematic structure of a optical waveguide element 500 which may be employed in a PLC in the prior art and FIG. 12 illustrates the process implemented to manufacture quartz optical waveguides in the prior art. A lower clad layer 504 and a core layer 506 having SiO2 as their main constituents are formed on an Si substrate 502 through a method Which uses to its advantage a gas-phase reaction such as the CVD (chemical vapor deposition) method or the FHD (flame hydrolysis deposition) method. The lower clad layer 504 and the core layer 506 are differentiated from each other by forming them with source gases having different compositions.

Next, unnecessary portions of the core layer 506 are removed through dry etching such as RIE (reactive ion etching) or RIBE (reactive ion beam etching). As a result, the remaining core layer 506, left in ridges, forms core portions 508.

Lastly, an upper clad layer 510 having SiO2 as its main constituent is formed so as to cover the core portions 508 through a method which uses a gas-phase reaction to advantage. The optical waveguide element 500 in the prior art is thus obtained. It is to be noted that in this optical waveguide element 500, quartz optical waveguides constituted of the lower clad layer 504, the core portions 508 and the upper clad layer 510 are formed.

However, as explained above, only one core layer is formed on the substrate constituted of Si or the like at the optical waveguide element in the prior art. Consequently, the optical waveguide element in the prior art is subject to a restriction under-which the light-wave circuits must be formed essentially within a single plane. The number of optical elements mounted at a single chip has been increasing to support even more advanced and diversified functions that PLCs must fulfill in recent years. The optical waveguide element subject to the restriction described above can only keep up with this trend by increasing the chip size, which in turn, leads to an increase in production costs.

As a solution to the common problem of PLCs in the prior art described above, Japanese Unexamined Patent Publication No. 1995/20344, for instance, discloses a method for forming a multilayer light-wave circuit substrate by alternately laminating a light-wave circuit substrate with optical waveguide circuit patterns formed therein and spacers.

However, since a spacer and a substrate are present between light-wave circuit layers that are next to each other, interference or coupling cannot be achieved between light-wave circuits formed in the different light-wave circuit layers through the method disclosed in the publication above. As a result, light-wave circuits must be formed within a single light-wave circuit layer if it is necessary to achieve interference or coupling between the light-wave circuits, just as in standard PLCs.

SUMMARY OF THE INVENTION

The present invention has been completed by addressing the problems discussed above and other problems of the optical waveguide element in the prior art.

Accordingly, the present invention as disclosed in claim 1 provides a optical waveguide element having n light-wave circuit layers each constituted of a core portion and a clad layer covering the core portion that are sequentially laminated to achieve a multilayer structure, with n representing an integer equal to or larger than 2.

According to the present invention as disclosed in claim 1, at least one optical waveguide with a core portion constituting a transmission path for light is formed within each light-wave circuit layer. Three-dimensional placement of a group of optical waveguides is achieved through the multilayer structure of the light-wave circuit layers. Thus, according to the present invention as disclosed in claim 1, the number of optical waveguides per unit area can be increased.

In addition, according to the present invention as disclosed in claim 1, at least two light-wave circuit layers are sequentially laminated without a substrate or a spacer present between them. Consequently, it is possible to achieve an interaction such as interference or coupling, of guided light-waves in the optical waveguides formed in different light-wave circuit layers. In addition, light-wave circuits can be formed three-dimensionally.

As explained above, according to the present invention a much higher degree of freedom is afforded in the formation of light-wave circuits through the increase in the number of optical waveguides per unit area and the three-dimensional formation of light-wave circuits. As a result, various types of light-wave circuits can be formed without having to take up a larger mounting area for the optical waveguide elements. This is expected to contribute to higher integration and further miniaturization of optical apparatuses.

It is to be noted that the core portions in the individual light-wave circuit layers may be formed at various positions according to the invention. For instance, a core portion may be positioned so that it is in complete contact with the surface constituting the boundary with the adjacent light-wave circuit layer, may be positioned so that it comes into partial contact with the surface constituting the boundary with the adjacent light-wave circuit layer at, at least, one point or may be positioned so that it is completely isolated from the adjacent light-wave circuit layer.

According to a feature of the present invention, an optical waveguide element having formed therein at least one optical coupler astride two or more light-wave circuit layers contiguous to each other in a multilayer structure is provided. This achieves a three-dimensional formation of light-wave circuits over a plurality of light-wave circuit layers. The optical coupler may be constituted of an optical coupler with a uniform distance between the optical waveguides at the coupled area such as a directional optical coupler or a parallel three-wave guiding channel directional optical coupler, or it may be constituted of a directional optical coupler with variable distances between the optical waveguides, for instance.

In addition, the optical coupler may be formed through any of various combinations of core portion groups in the contiguous light-wave circuit layers. According to the present invention, each of the contiguous light-wave circuit layers may include at least one core portion to constitute the optical coupler, the core portions constituting the optical coupler may be included only in every other light-wave circuit layer or the core portions constituting the optical coupler may be completely randomly provided among the contiguous light-wave circuit layers. It is to be noted that the core portions constituting the optical coupler in the structure fulfill a function of guiding light energy, a function of relay coupling two other core portions or a function achieving a combination of these functions.

According to a further feature of the present invention an optical waveguide element having formed therein an optical coupler astride two contiguous light-wave circuit layers in a multilayer structure is provided. The optical coupler is constituted of at least two core portions. Accordingly, at least one core portion is formed in each of the two ligh t-wave circuit layers to constitute the optical coupler . In addition, since the optical coupler is formed astride the two light-wave circuit layers, there is at least one pair of core portions coupled with each other over the boundary of the light-wave circuit layers among the two or more core portions constituting the optical coupler. According to the present invention as disclosed in claim 3, the coefficient of coupling of the optical coupler can be adjusted by controlling the distance between the pair of core portions.

According to still a further feature of the present invention, an optical waveguide element having formed therein an optical coupler astride three contiguous light-wave circuit layers in a multilayer structure which achieves coupling of core portions in the light-wave circuit layers at the two ends via a core portion in the intermediate light-wave circuit layer, is provided. It is to be noted that this embodiment of the invention may assume a structure in which the core portion in the intermediate light-wave circuit layer is terminated within the intermediate light-wave cir- cuit. layer and, therefore, does not fulfill the light-wave guiding function. Or, the core portion in the intermediate light-wave circuit layer may be left unterminated so that it, too, fulfills a light-wave guiding function, instead.

In addition, according to the present invention, an optical waveguide element assuming a structure with core portions formed as channels is provided. This embodiment of the invention makes it possible to form a planar light-wave circuit with, at least, one core portion formed as a channel in each light-wave circuit layer. Thus, light-wave circuits can be formed both along the direction of lamination and within the individual light-wave circuit layers so that a optical waveguide element which allows a complex and threedimensional formation of light-wave circuits is pro- vided. It is to be noted that in this embodiment of the invention , the core portion channels may assume any of various shapes such as a curved shape, a linear shape or a branching shape.

According to another feature of the present invention, an optical waveguide element with, at least, either the core portions or the clad layers constituted mainly of SiO2 is provided. The resulting structure allows easy matching of the optical characteristics of optical waveguides constituted of core portions and clad layers and the optical character- istics of optical fibers that are normally used as optical signal transmission lines. Thus, the structure disclosed achieves an optical waveguide element that can be easily connected with an optical fiber while manifesting only a small degree of insertion loss in the optical communication system.

The present invention, as disclosed, provides for a further feature in which an optical waveguide element having a substrate constituted of Si which supports n light-wave circuit layers. The structure disclosed may be effectively adopted when core portions and clad layers have SiO2 as their main constituent, e.g., when the core portions and clad portions constitute quartz optical waveguides.

The invention also relates to an optical waveguide ele- ment manufacturing method that includes a first step in which a first clad layer is formed, a second step in which a kth core portion is formed on a kth clad layer, a third step in which a (k+1)th clad layer is formed to cover the kth core portion and a fourth step in which the second step and the third step are alternately repeated n times. Through the use of the method according to the invention an optical waveguide element according to the present invention in which the core layer in each light-wave circuit layer is formed in a state in which the core layer is in complete contact with the surface constituting the boundary with an adjacent light-wave circuit layer can be formed. "k" repre- sents an integer that is equal to or larger than 1 and equal to or smaller than n.

According to the method of the present invention, in which the core layers are sequentially formed with clad layers enclosed between them, the distance between the individual core layers is controlled in conformance to the thickness of the clad layers. The clad layers may be formed through any of various methods including the CVD method the FHD method, the sputtering method, the vacuum depo- sition method and the epitaxial method. Any of these for- mation methods achieves a higher degree of process accu- racy compared to photolithography and etching performed for core portion patterning. Thus, the thickness of the clad layers can be controlled with a higher degree of accuracy compared to the accuracy of the core portion patterning.

As described above, according to the method of the present invention, the distances between the core portions are controlled with a high degree of accuracy to achieve the interaction of guided light-waves in the core portions as intended in design, thereby achieving an improvement in the yield of the optical waveguide element according to the present invention.

In addition, according to a feature of the method invention, an optical waveguide element manufacturing method in which the kth clad layer is formed through the CVD method is provided. According to the present method invention, the distance between the core portions can be controlled with an extremely high degree of accuracy by taking advantage of the accurate film thickness control that the CVD method achieves. It is to be noted that while there are various CVD methods such as a normal temperature CVD method, a vacuum CVD method, a plasma CVD method and a laser CVD method in the known art, any one of such CVD methods may be employed in the method invention.

A further feature of the invention provides an optical waveguide element manufacturing method in which the third step comprises a process in which a source material layer from which the kth core portion is to be constituted is formed on the kth clad layer and a process in which unnecessary portions of the source material layer are removed through reactive ion etching to form the kth core portion. According to this feature of the present invention, core portions can be formed as channels achieving a specific pattern. Thus, a highly complex light-wave circuit can be achieved through the interaction of the core portions along the direction of the lamination and through the core portion pattern achieved within a plane perpendicular to the direction of the lamination.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The following is a detailed explanation of the preferred embodiments of the present invention, given in reference to the attached drawings. It is to be noted that in the following explanation and the attached drawings, the same reference numbers are assigned to components achieving identical functions and structural features to preclude the necessity for a repeated explanation thereof. In addition, in the following explanation and the attached drawings, the direction along which light enters is set as the z axis direction, the direction perpendicular to the z axis direction and roughly parallel to the plane of the substrate is set as the x axis direction and the direction perpendicular to the z axis direction and also roughly perpendicular to the plane of the substrate is set as the y axis direction.

(1) First Embodiment

Figure 1:
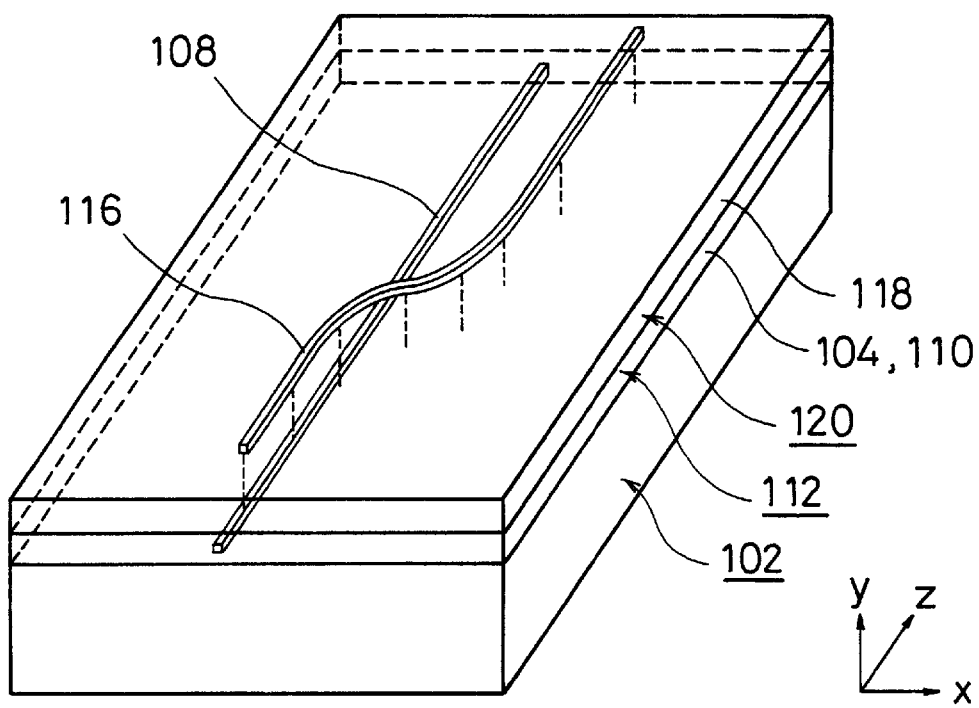
FIG. 1 is a perspective view illustrating a schematic structure of a optical waveguide element according to the present invention.
Figure 2:
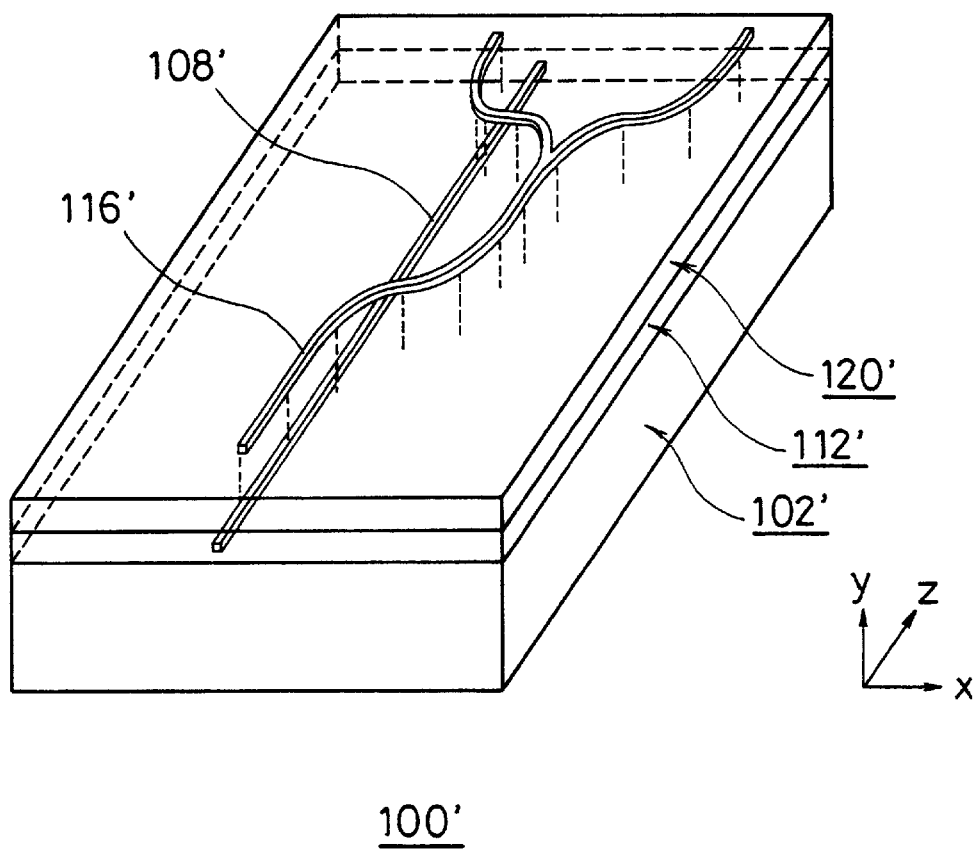
FIG. 2 is a perspective view illustrating a schematic structure of another optical waveguide element according to the present invention.
Figure 3:
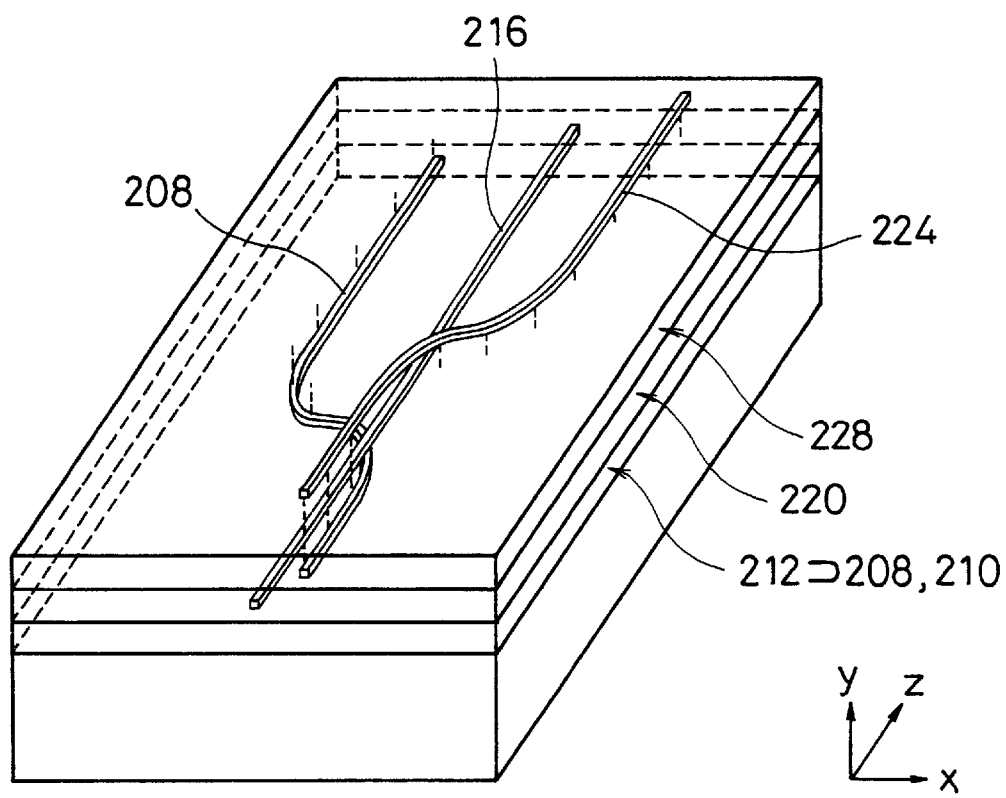
FIG. 3 is a perspective view illustrating a schematic structure of yet another optical waveguide element according to the present invention.
Figure 4:
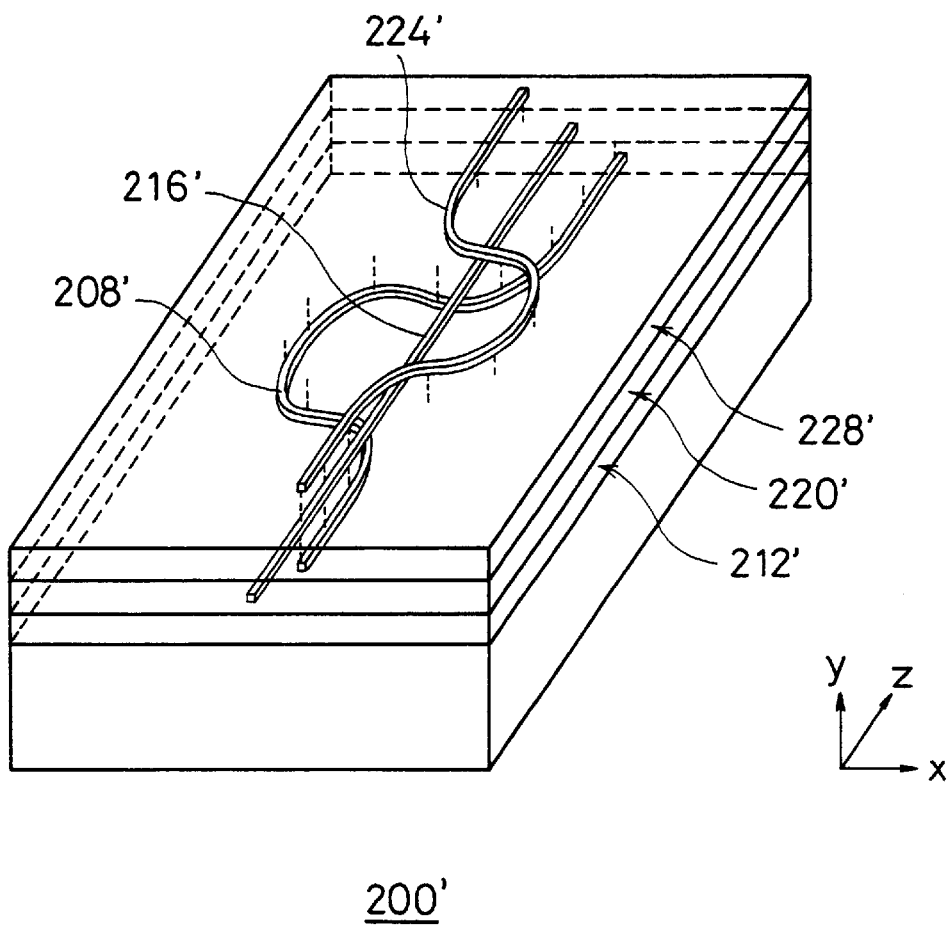
FIG. 4 is a perspective view illustrating a schematic structure of yet another optical waveguide element according to the present invention.
Figure 5:
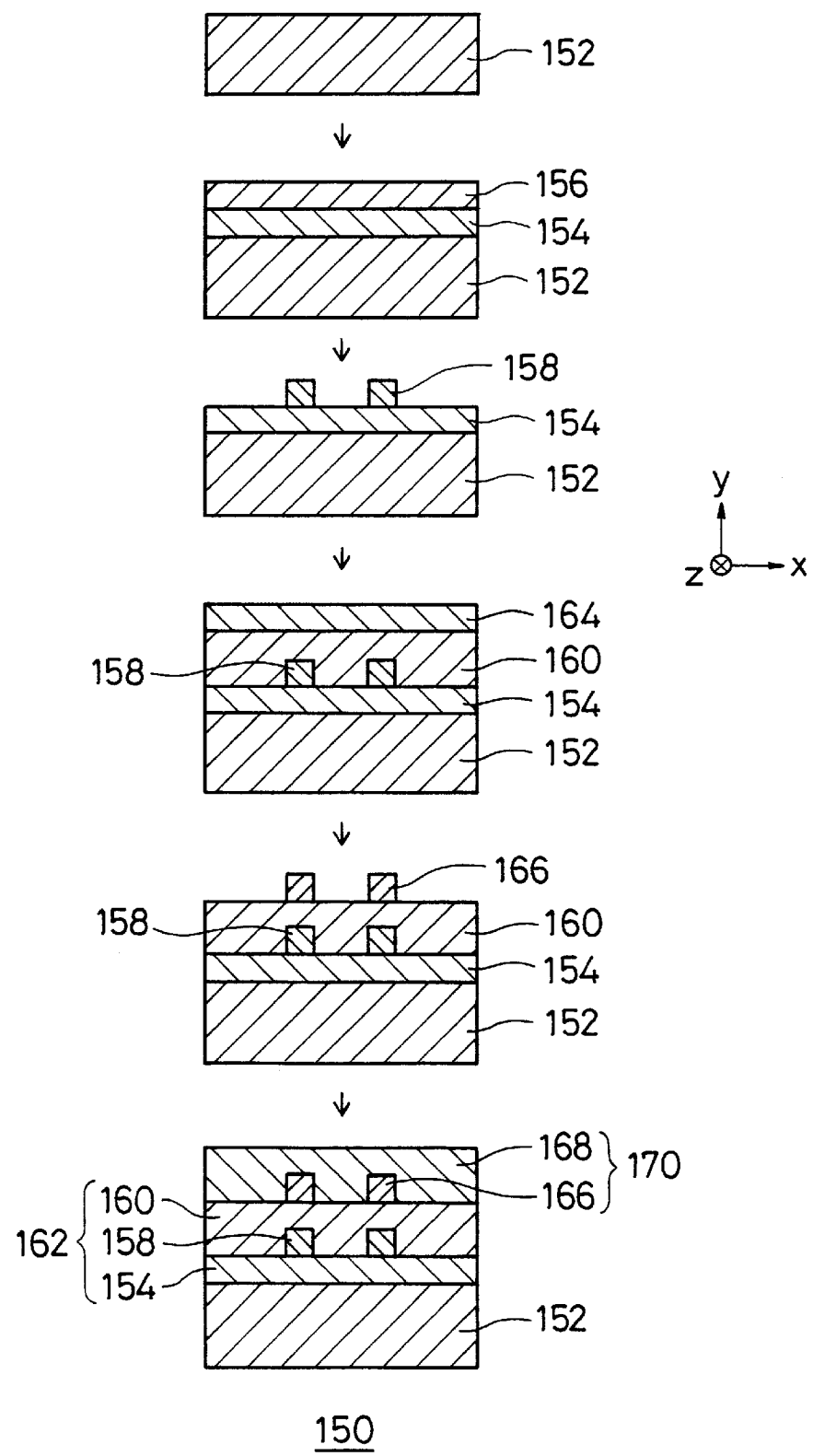
FIG. 5 illustrates a optical waveguide element manufacturing method according to the present invention.
Figure 6:
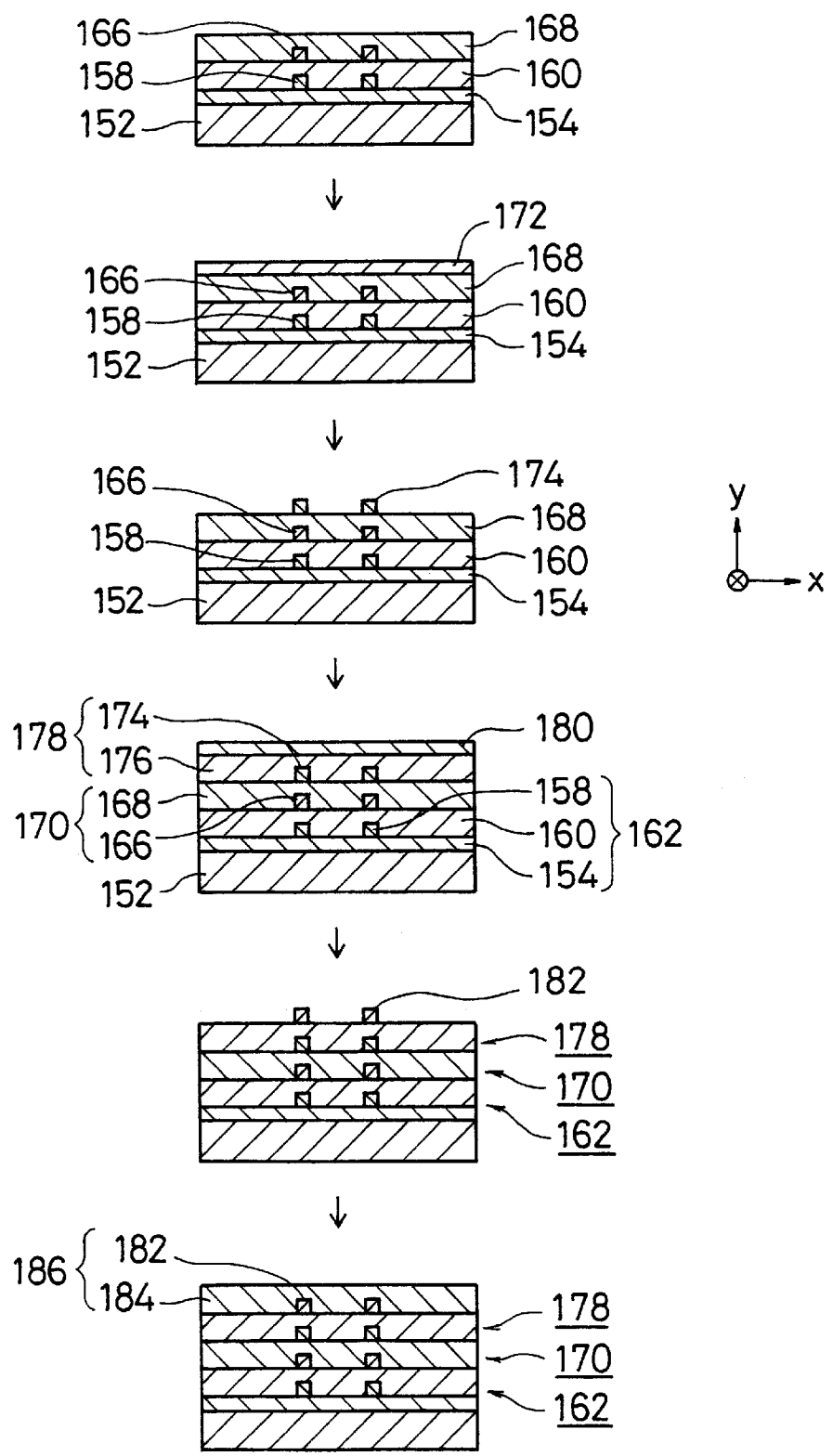
FIG. 6 illustrates another optical waveguide element manufacturing method according to the present invention.

First, in reference to FIGS. 1 to 6, the first embodiment is explained. It is to be noted that FIGS. 1 and 2 are perspectives illustrating schematic structures of two-layer optical waveguide type optical waveguide elements in the embodiment. In addition, FIGS. 3 and 4 are perspectives illustrating schematic structures of three-layer optical waveguide type optical waveguide elements in the embodiment. FIG. 5 illustrates a method for manufacturing the two-layer optical waveguide type optical waveguide element in the embodiment, whereas FIG. 6 illustrates a method for manufacturing the multilayer optical waveguide type optical waveguide element having at least two layers in the embodiment.

(1-1) Structures of Optical Waveguide Elements

In the embodiment, a optical waveguide element 100 assuming the two-layer optical waveguide structure illustrated in FIG. 1 is achieved. As shown in FIG. 1, the optical waveguide element 100 is provided with an Si substrate 102, and a first light-wave circuit layer 112 and a second light-wave circuit layer 120 that are sequentially laminated on the substrate 102 along the y direction.

A linear first core portion 108 extending almost parallel to the z axis is formed in the first light-wave circuit layer 112. In the optical waveguide element 100, the first core portion 108 is secured by a first clad layer 104 formed toward the substrate 102 and a second clad layer 110 formed. toward the second light-wave circuit layer 120, thereby forming a first optical waveguide structure.

In addition, a curved second core portion 116 is formed in the second light-wave circuit layer 120. In the optical waveguide element 100, the second core portion 116 is secured by the second clad layer 110 formed at the first light-wave circuit layer 112 and a third clad layer 118 at the second light-wave circuit layer 120, thereby forming a second optical waveguide structure.

In the optical waveguide element 100, the second core portion 116 has a linear portion extending over a specific length which is located within a plane that includes the first core portion 108 and extends almost perpendicular to the z-x plane. In the optical waveguide element 100, waveguide mode coupling can be achieved between the first core portion 108 and the linear portion of the second core portion 116.

Also, in the embodiment, an optical waveguide element 100' adopting the two-layer optical waveguide structure illustrated in FIG. 2 is achieved. As illustrated in FIG. 2, the optical waveguide element 100' is provided with an Si substrate 102' and a first light-wave circuit layer 112' and a second light-wave circuit layer 120' which are sequentially laminated on the substrate 102' in the y direction. In the optical waveguide element 100', the first light-wave circuit layer 112' has a structure almost identical to that of the first light-wave circuit layer 112 shown in FIG. 1.

The structure of the second light-wave circuit layer 120', on the other hand, is different from that of the second light-wave circuit layer 120 in FIG. 1, in that a curved second core portion 116' branches in the middle in a y shape. By adopting this structure, the light-wave energy that is distributed from a first core portion 108' to the second core portion 116' in the optical waveguide element 100' can be further branched.

In the optical waveguide element 100', the curved second core portion 116' has formed therein a linear portion extending over a specific length at the joined wave portion preceding the branch. In the optical waveguide element 100', the linear portion of the curved second core portion 116' is formed within a plane that includes the first core portion 108' and is almost perpendicular to the z-x plane to achieve coupling of the first core portion 108' and the linear portion of the second core portion 116'. It is to be noted that while one of the branches of the second core portion 116' cross the first core portion 108', a sufficient coupling length is not achieved at the crossing portion and, therefore, hardly any coupling of the first core portion 108' and the second core portion 116' occurs.

In addition, optical waveguide elements adopting a three-layer optical waveguide structure such as a optical waveguide element 200 shown in FIG. 3 and a optical waveguide element 200' shown in FIG. 4 are achieved in the embodiment. As illustrated in FIGS. 3 and 4, the optical waveguide elements 200 and 200' each achieve a three-layer optical waveguide structure constituted of three light-wave circuit layers that are sequentially laminated. Namely, the optical waveguide elements 200 and 200' assume structures essentially achieved by laminating a third light-wave circuit layer on the optical waveguide elements 100 and 100' in FIGS. 1 and 2.

In the optical waveguide element 200 illustrated in FIG. 3, portions of a first core portion 208 at a first light-wave circuit layer 212, a second core portion 216 at a second light-wave circuit layer 220 and a third core portion 224 at a third light-wave circuit layer 228 extend almost parallel to one another along the y axis direction to induce mutual coupling. In such a optical waveguide element 200, coupling of the first core portion 208 and the third core portion 224 may be achieved via the second core portion 216, for instance, as well as achieving coupling of adjacent core portions. Alternatively, the guided light-wave at the second core portion 216 may be distributed between the first core portion 208 and the third core portion. In addition, in the optical waveguide element 200' shown in FIG. 4, a coupling portion and a three-dimensional crossing portion are constituted by a first core portion 208' at a first light-wave circuit layer 212', a second core portion 216' at a second light-wave circuit layer 220' and a third core portion 224' at a third light-wave circuit layer 228'.

Under normal circumstances, by increasing the number of light-wave circuit layers that are sequentially laminated on the Si substrate, a optical waveguide element achieving an n-layer optical waveguide structure with n light-wave circuit layers can be constituted in the embodiment. n represents a natural number equal to or larger than 2. By adjusting the film thickness of the clad layers, the shapes of the core portions, the placement positions of the core portions within the light-wave circuit layers and the like, for instance, the positional relationships among the core portions can be freely adjusted so that a specific three-dimensional light-wave circuit structure is achieved for the entire, optical waveguide element. It is to be noted that in any of the optical waveguide elements in the embodiment, another light-wave circuit structure may be formed on the uppermost clad layer or via a substrate or a spacer.

(1-2) Optical Waveguide Element Manufacturing Method

As illustrated in FIG. 5, in the optical waveguide element manufacturing method, first, a first clad layer 154 and a first core layer 156 are sequentially formed on a substrate surface 152a of an Si substrate 152 through the CVD method. The first clad layer 154 and the first core layer 156 both have SiO2 as their main constituents. However, the composition of the source gas used when growing the first clad layer 154 and the composition of the source gas used for growing the first core layer 156 are different, so that a specific difference in the specific refraction factor is created between the first clad layer 154 and the first core layer 156.

Next, unnecessary portions of the first core layer 156 are removed through RIE, leaving ridge-like first core portions 158 on the first clad layer 154.

Then, a second clad layer 160 having SiO2 as its main constituent is formed covering the first core portions 158 on the first clad layer 154 through the CVD method. Next, a second core layer 164 having SiO2 as its main constituent is formed on the second clad layer 160 by changing the composition of the source gas. During this process, the second clad layer 160 is formed to a thickness which allows coupling to occur between the portion 158 of the first core layer 156 and the second core layer 164.

Next, unnecessary portions of the second core layer 164 are removed through RIE, leaving ridge-like second core portions 166 on the second clad layer 160. Lastly, a third clad layer 168 having SiO2 as its main constituent is formed covering the second core portions 166 through the CVD method.

As a result, a optical waveguide element 150 achieving a two layer optical waveguide structure is obtained. It is to be noted that in the optical waveguide element 150, a first light-wave circuit layer 162 is constituted of the first clad layer 154, the first core portions 158 and the second clad layer 160. A second light-wave circuit layer 170 is constituted of the second core portions 166 and the third clad layer 168.

Furthermore, in this embodiment, a third light-wave circuit layer 178 may be formed by forming a third core layer 172 following the formation of the third clad layer 168, forming third core portions 174 through removal of unnecessary portions of the third core layer 172 and forming a fourth clad layer 176 as illustrated in FIG. 6, to obtain a optical waveguide element assuming a three-layer optical waveguide structure. Moreover, in; the embodiment, a fourth light-wave circuit layer 186 may be formed by forming a fourth core layer 180 following the formation of the fourth clad layer 176, forming fourth core portions 182 through removal of unnecessary portions of the fourth core layer 180 and forming a fifth clad layer 184, to obtain a optical waveguide element assuming a four-layer optical waveguide structure.

As explained above, through this embodiment, by sequentially repeating the formation of a kth light-wave circuit layer achieved by forming a kth core layer following the formation of a kth clad layer, forming kth core portions and then forming a (k+1)th clad layer, a optical waveguide element assuming a multilayer optical waveguide structure with n light-wave circuit layers is obtained. k represents a natural number equal to or smaller than n.

(1-3) Functions of Optical Waveguide Elements

Next, the functions achieved by the optical waveguide elements in the embodiment are explained It is to be noted that while the explanation is given on the functions fulfilled by the optical waveguide element 100' in FIG. 2 constituting a directional optical coupler as an example, almost identical functions are achieved by the optical waveguide element 100 in FIG. 1, the optical waveguide element 200 in FIG. 3 and the optical waveguide element 200' in FIG. 4.

In the optical waveguide element 100', the first core portion 108' formed at the first light-wave circuit layer 112' and the second core portion 116' formed at the second light-wave circuit layer 120' are placed within different x-z planes across the second clad layer 110'.

Thus, the coupling between the first core portion 108' and the second core portion 116' is achieved along the y axis direction. In addition, the first core portion 108' and the second core portion 116' can be made to cross each other three-dimensionally without achieving effective coupling. It is to be noted that while it is conceivable that coupling between the first core portion 108' and the second core portion 116' may be induced at the three-dimensional crossing portion, as well, no significant coupling occurs due to a small coupling length at the crossing portion.

In addition, the distance between the first core portion 108' and the second core portion 116' at the optical waveguide element 100' is determined in conformance to the layer thickness of the second clad layer 110'. This distance can be controlled with a higher degree of accuracy compared to the accuracy with which photolithography or dry etching is performed, through film thickness control achieved by forming the second clad layer 110' through a specific method. Thus, in the optical waveguide element 100', the distance between the first core portion 108' and the second core portion 116' can be set to a value that allows light energy to be distributed at a desired coupling coefficient with ease.

Figure 12:
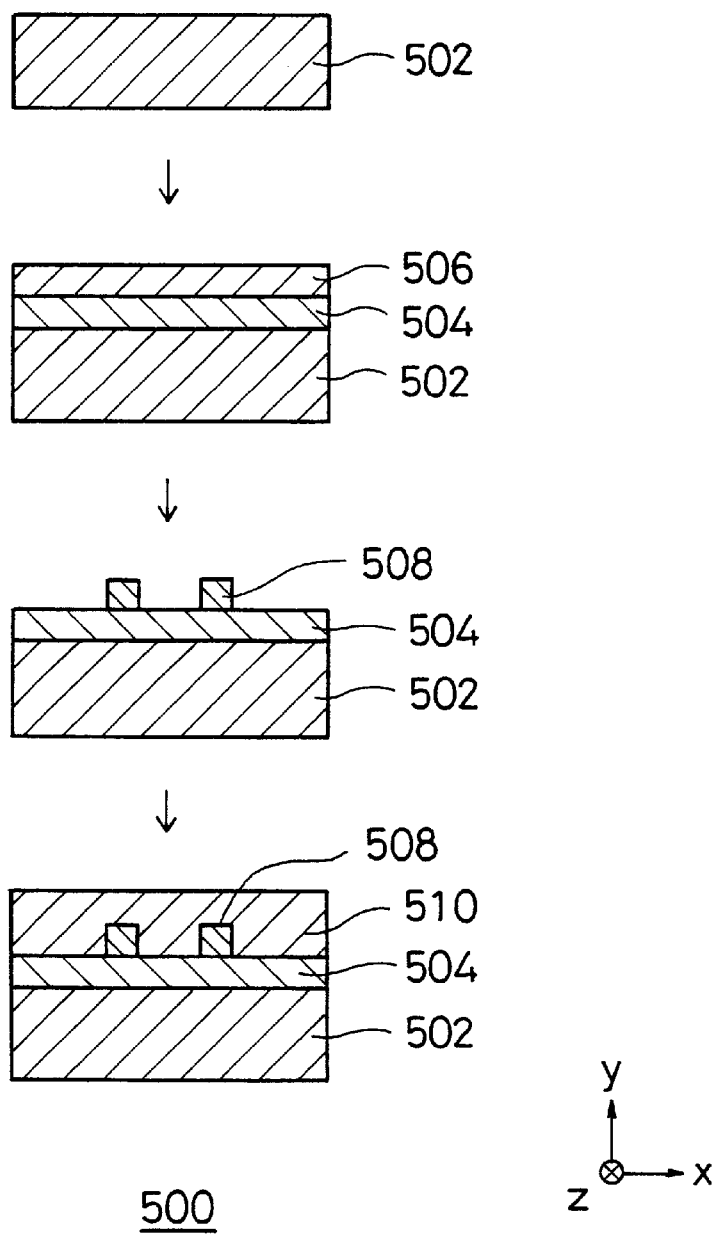
FIG. 12 illustrates a optical waveguide element manufacturing method in the prior art.

In contrast, in the directional optical coupler achieved in the optical waveguide element 500 in the prior art in FIG. 12 explained earlier, the two optical waveguides (having the core portions 508) are provided within a single x-z plane and the coupling between the two optical waveguides, too, is achieved within the x-z plane. As a result, the two optical waveguides that have been coupled cannot be made to cross each other in the PLC in the prior art. In addition, it is difficult to set the width of the optical waveguides and the distance between the two optical waveguides in the optical waveguide element 500 in the prior art as intended in design, since they are affected by the accuracy with which photolithography or dry etching is performed to form the core portions 508. Thus, it is difficult to distribute light energy at a desired coupling coefficient between the two optical waveguides in the optical waveguide element 500 in the prior art.

(1-4) Advantages

As explained above, in a directional optical coupler achieved through the embodiment, for instance, coupling of optical waveguides provided at two different planes roughly parallel to each other can be achieved along a direction roughly perpendicular to the two planes. Thus, after the two optical waveguides are coupled, they can be made to cross each other freely. As a result, a more complex light-wave circuit structure compared to the prior art can be achieved. In addition, with the higher degree of freedom afforded in design of optical waveguides, a higher degree of freedom is also afforded in the positions of photoactive elements and optical fibers to be coupled to the optical waveguides. In addition, an even more complex light-wave circuit structure can be achieved by providing three or more light-wave circuit layers in the embodiment.

Moreover, the distance between two optical waveguides is determined through film thickness control achieved by forming the second clad layer in a specific method in the embodiment. As a result, the coefficient of coupling between the optical waveguides can be controlled with a higher degree of accuracy in the embodiment compared to optical waveguide elements in the prior art. In particular, since the second clad layer is formed through a CVD method achieving superior film thickness control (consistency, reproducibility), the distance between wave guiding channels can be controlled very accurately to achieve desired wave distribution characteristics.

(2) Second Embodiment

Figure 7:
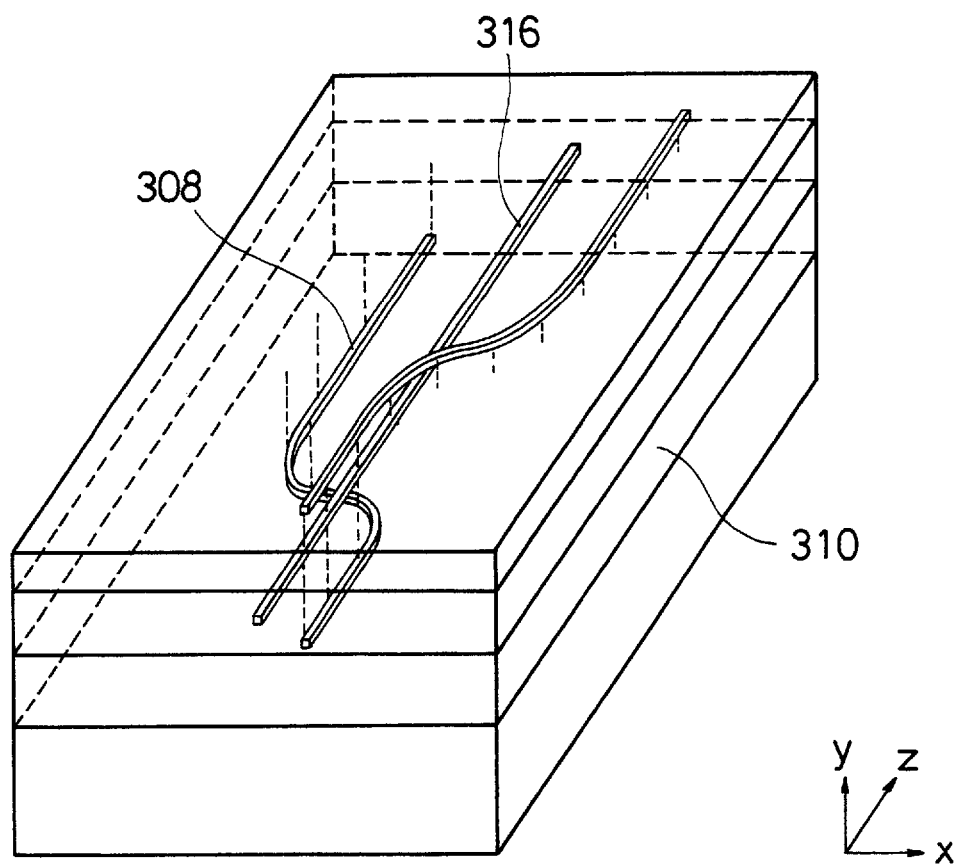
FIG. 7 is a perspective view illustrating a schematic structure of yet another optical waveguide element according to the present invention.
Figure 8:
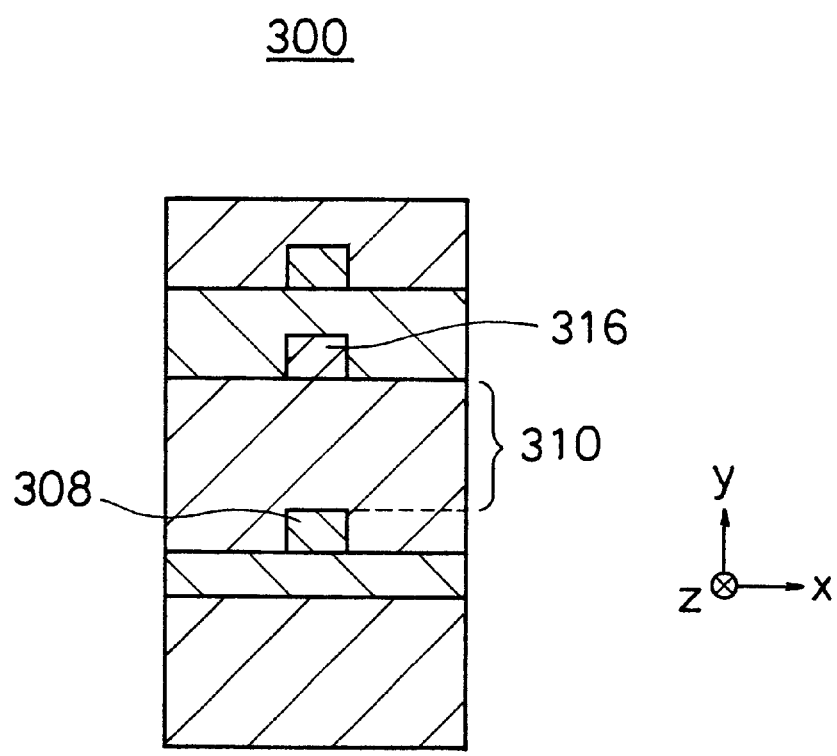
FIG. 8 is a sectional view illustrating the operation of the optical waveguide element in FIG. 7.

Next, in reference to FIGS. 7 and 8, the second embodiment is explained. It is to be noted that FIG. 7 is a perspective view illustrating a schematic structure of a optical waveguide element 300 in the second embodiment whereas FIG. 8 is a sectional view illustrating the structure of the optical waveguide element 300.

As illustrated in FIGS. 7 and 8, the optical waveguide element 300 in the embodiment assumes a second clad layer structure which is different from that adopted in the optical waveguide element 200 in the first embodiment explained earlier. Other structural features are essentially identical to those of the optical waveguide element 200.

In the optical waveguide element 300, a second clad layer 310 is formed to achieve a film thickness great enough to ensure that no coupling is induced between a first core portion 308 and a second core portion 316. Namely in the optical waveguide element 300, the two core portions that face opposite each other within a single y-z plane, i.e., the first core portion 308 and the second core portion 316, in the optical waveguide element 300 are not allowed to couple with each other by setting the film thickness of the second clad layer 310 present between the two layers to a large value.

The film thickness of the second clad layer 310, which will not allow coupling to occur between the first core portion 308 and the second core portion 316, is determined in correspondence to the difference in the specific refraction factor between the two core portions and the second clad layer 310, the wavelength of the light, the cross sectional shapes of the two core portions or the like. For instance, when the difference in the specific refraction factor between the wave guiding channels having a small difference in the refraction factor between them is approximately 0.3%, the cross sectional shapes of the cores are both an approximate 8 micrometer×8 micrometer square and the light-wavelength is approximately 1.31 micrometer, the coupling coefficient k is approximately 51.5. Thus, when the film thickness of the clad layer is set at 10 micrometer under these circumstances, the complete coupling length is approximately 30 cm, which indicates that hardly any coupling is induced between the core portions in a standard light-wave circuit size (approximately 1 cm). Since these conditions are presented as a common example, it can be assumed that by setting the film thickness of the second clad layer 310 to 10 micrometer or greater, multilayer optical waveguides with no coupling induced between the first core portion 308 and the second core portion 316 can be obtained.

As explained above, in the optical waveguide element in this embodiment, no coupling is induced between the first core portion and the second core portion. As a result, a high degree of isolation can be sustained between the first core portion and the second core portion at any location. In addition, since no substrate or spacer is present between the first core portion and the second core portion, the chip volume can be reduced to achieve a reduction in production costs.

(3) Third Embodiment

Figure 9:
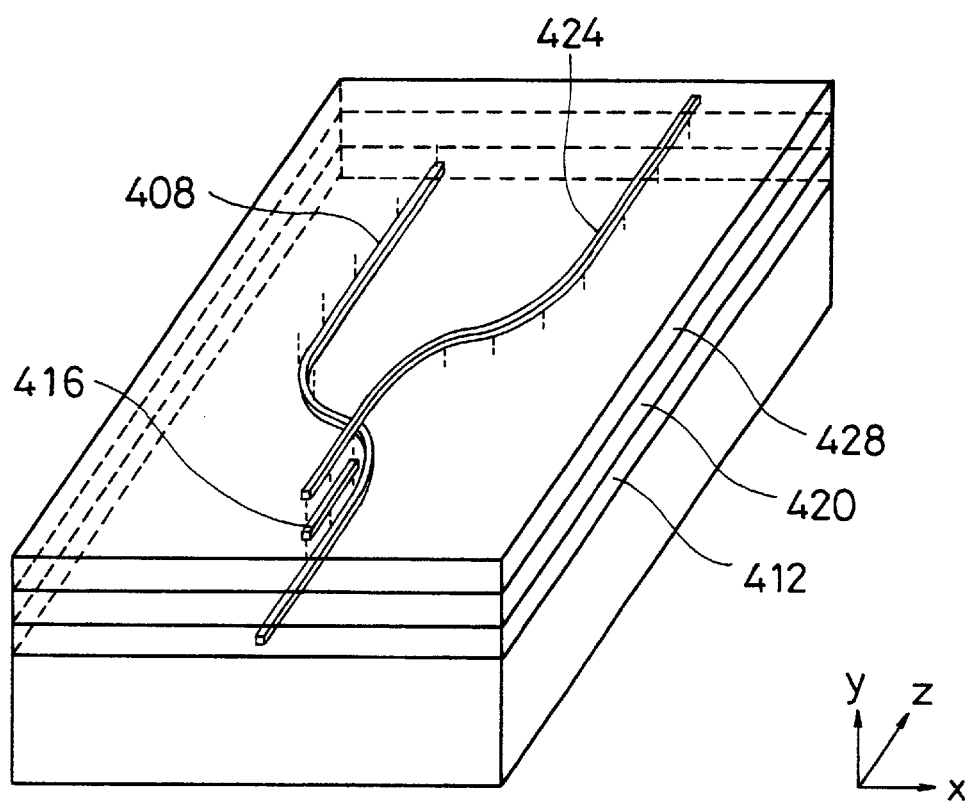
FIG. 9 is a perspective illustrating a schematic structure of yet another optical waveguide element that may adopt the present invention.
Figure 10:
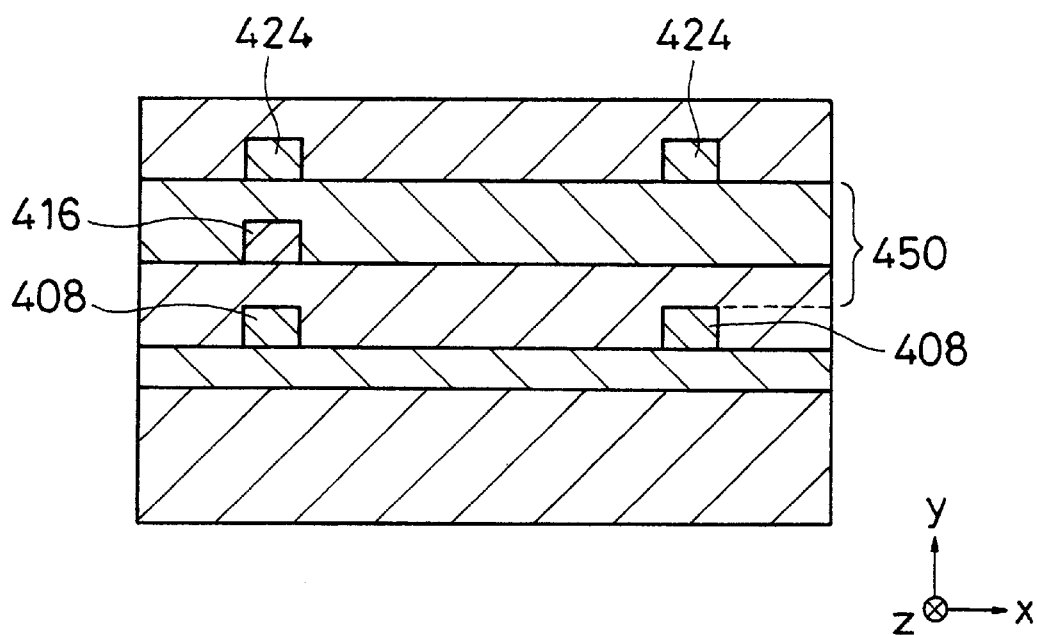
FIG. 10 is a sectional view illustrating the operation of the optical wavelength element in FIG. 9.
Figure 11:
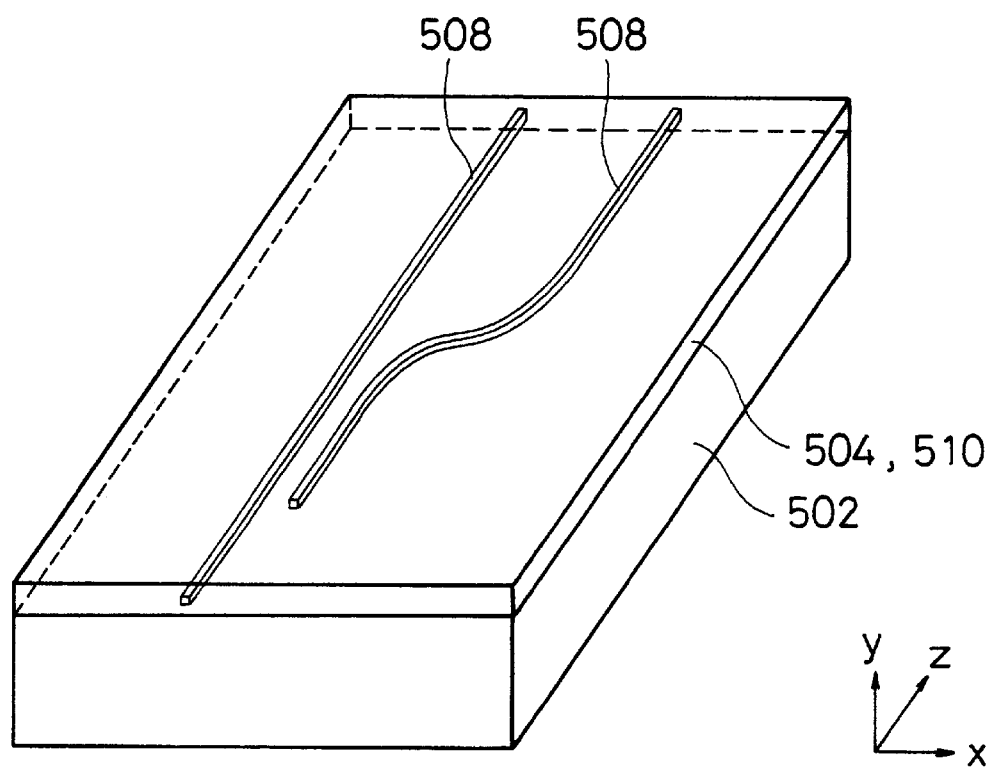
FIG. 11 is a perspective view illustrating a schematic structure of a optical waveguide element in the prior art.

Next, in reference to FIGS. 9 and 10, the third embodiment is explained. It is to be noted that FIG. 9 is a perspective illustrating a schematic structure of a optical waveguide element 400 in the third embodiment, whereas FIG. 10 is a sectional view illustrating the structure of the optical waveguide element 400.

In this embodiment, an intermediate wave guiding channel for coupling odd-numbered core portions alone is provided as an evennumbered core portion. A more specific explanation is given by using as an example the optical waveguide element 400 in the embodiment illustrated in FIGS. 9 and 10. As illustrated in FIGS. 9 and 10 the optical waveguide element 400 assumes a second core portion structure which is different from that adopted in the optical waveguide element 200 in the first embodiment illustrated in FIG. 3, and its other structural features are essentially identical to those of the optical waveguide element 200.

In the optical waveguide element 400, a second core portion 416 is formed over the area where a first core portion 408 and a third core portion 424 are aligned along the y axis direction, i.e., the area where the first core portion 408 and the third core portion 424 are coupled with each other. In addition, at least one end of the second core portion 416 is terminated within a second light-wave circuit layer 420. While the second core portion 416 assuming this structure is a relay optical coupling of the first core portion 408 at a first light-wave circuit layer 412 and the third core portion 424 at a third light-wave circuit layer 428, it cannot guide light-waves to the outside of the optical waveguide element 400.

Now the operation achieved in the optical waveguides in the embodiment is explained by using the operation of a directional coupler as an example. As illustrated in FIG. 10, within a single y-z plane, where the first core portion 408, the second core portion 416 and the third core portion 424 are present, part of the light being transmitted through the first core portion 408 is diverted to the second core portion 416 through the coupling of the first core portion 408 and the second core portion 416. In addition, part of the light being transmitted through the second core portion 416 is diverted to the third core portion 424 through the coupling of the second core portion 416 and the third core portion 424.

If, on the other hand, only the first core portion 408 and the third core portion 424 are present within a single y-z plane, the distance 450 between the first core portion and the third core portion becomes extremely large and, as a result, coupling does not occur between the first core portion 408 and the third core portion 424. Thus, the first core portion 408 and the third core portion 424 that have been coupled can be made to cross each other while sustaining a high degree of isolation from each other.

It is to be noted that if the number of light-wave circuit layers that are laminated is increased, too, a third core portion and a fifth core portion are coupled via a fourth core portion and the fifth core portion and a seventh core portion are coupled via a sixth core portion in a similar manner in the embodiment. In other words, in a optical waveguide element achieving a n-layer optical waveguide structure with n light-wave circuit layers in the embodiment, a (2j–1)th core portion and a (2j+1)th core portion are coupled via a 2jth core portion. In this case, n represents an arbitrary natural number equal to or larger than 3. In addition, j represents a natural number equal to or smaller than n/2 if n is an even number and represents a natural number equal to or smaller than (n–1)/2 if n is an odd number.

Furthermore, in this embodiment, an even-numbered core portion can be formed only for coupling two odd-numbered core portions with each other. For this reason, the even-numbered core portion does not need to be present in an area where the two oddnumbered core portions simply cross each other. Thus, the two oddnumbered core portions can be made to cross each other while sustaining a high degree of isolation.

In the embodiment described above, two odd-numbered core portions can be coupled by forming an even-numbered core portion. In addition, by crossing two odd-numbered core portions in an area where no even-numbered core portion is formed, a high degree of isolation can be sustained for the odd-numbered core portions in the crossing area.

It is to be noted that in an application of this embodiment, an intermediate wave guiding channel for coupling an upper wave guiding channel and a lower wave guiding channel can be provided in any light-wave circuit layer. In addition, the embodiment may be adopted in combination with the second embodiment, i.e., a combination of the structure in which an intermediate wave guiding channel is employed within a given optical waveguide element to sustain a high degree of isolation and a structure in which a high degree of isolation is sustained by setting the clad layer thickness to a large value.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

While the optical waveguide element manufacturing method, in which clad layers and core portions are formed through CVD, is explained as an example in reference to the embodiments, the present invention is not limited to this example. The present invention may be adopted in a optical waveguide element manufacturing method that employs any of various other forming methods to form at least either the clad layers or the core portions. For instance, it may be adopted in a manufacturing method in which either the clad layers or the core portions are formed through a method which uses to advantage gasphase reaction such as the FHD method or a method that does not utilize any gas phase reaction, such as spin coating or thermal diffusion.

While an explanation is given in reference to the embodiments on an example in which a optical waveguide element is manufactured by performing RIE for core portion patterning, the present invention is not limited to this example. The present invention may be adopted in a optical waveguide element manufacturing method that employs any of various other etching methods for core portion patterning. Those various etching methods include other dry etching methods including RIBE and wet etching methods.

While optical waveguide elements with their clad layers and their core portions constituted of $SiO_2$ are used as examples in the explanation of embodiments, the present invention is not limited to these examples. The present invention may be adopted in a optical waveguide element with at least either clad layers or core portions thereof constituted of any of various other source materials. For instance, the clad layers or the core portions may be constituted of an organic material such as an epoxy or a polyurethane, a chalcogenide material such as arsenic sulfide, an electro-optical crystalline material such as lithium niobate or lithium tantalate, a magnetic material such as yttrium iron garnet, a metal oxide such as zinc oxide or gallium aluminum arsenide.

While optical waveguide elements having a substrate constituted of Si are used in the explanation of the embodiments above, the present invention is not limited to such an example. The present invention may be adopted in a optical waveguide element having a substrate constituted of any of various other materials. For instance, the substrate may be constituted of soda glass, pyrex glass, lithium niobate, alumina, quartz or gallium aluminum arsenide. In other words, according to the present invention, an appropriate source material can be selected to constitute the substrate in correspondence to the material used to constitute the optical waveguides.

While optical waveguide elements having light-wave circuits constituting directional couplers are explained in reference to the embodiments, the present invention is not limited to such an example. The present invention may be adopted in a optical waveguide element having any of various other types of light-wave circuits. For instance, light-wave circuits may constitute linear optical waveguides, curved optical waveguides such as S-shaped wave guiding channels, branching wave guiding channels such as y-branch wave guiding channels, Mach-Zehnder wave guiding channels or a combination of these.

While optical waveguide elements having core portions assuming a bulk structure are used as an example in the explanation of the embodiments, the present invention is not limited to this structural example. The present invention may be adopted in a optical waveguide element assuming any of various other core portion structures. For instance, core layers may adopt a quantum well structure such as a single quantum well structure, a multiple quantum well structure or a distorted quantum well structure or they may adopt a containment isolation heterogeneous structure or the like.

While optical waveguide elements having core portions with a specific internal structure are explained as an example in reference to the embodiments, the present invention is not limited to this structural example. The present invention may be adopted in a optical waveguide element having core portions achieved through any of various other internal structures. For instance, the core portions may assume a grating structure, a chirped grating structure or a structure in which varying refraction factors are randomly distributed.

According to the present invention, a three-dimensional light-wave circuit formation is achieved. As a result, a complex light-wave circuit structure can be achieved without requiring a larger mounting area for the optical waveguide element. In addition, according to the present invention, the distance between core portions can be adjusted through clad layer thickness control and thus, the distance between the core portions can be controlled with a very high degree of accuracy. Consequently, it is possible to realize an optical interaction such as optical interference or optical coupling between core portions as intended in design, to achieve an improvement in the performance and the yield of the light-wave circuits.

The entire disclosure of Japanese Patent Application No. 11-129997 filed on May 11, 1999 including specification, claims, drawings and summary is incorporated herein by reference in its entirety.

What is claimed is:

1. A optical waveguide element, having n substantively planar light-wave circuit layers, each constituted of a core portion for receiving and guiding a light signal and a clad layer covering said core portion, that are sequentially laminated to achieve a multilayer structure (n represents an integer equal to or larger than 2); and wherein at least a linear portions of a specific length of the core portions in at least two contiguous light wave circuit layers are aligned parallel to one another in a common plane extending substantially perpendicular to the planes of the light-wave circuit layers to produce optical coupling between the respective linear potions of the aligned core portions.

2. An optical waveguide element according to claim 1, wherein: said core portion is formed as a channel.

3. An optical waveguide element according to claim 1, wherein: at least either said core portion or said clad layer has SiO2 as a main constituent thereof.

4. An optical waveguide element according to claim 1, having a substrate constituted of Si to support said n light-wave circuit layers.

5. A optical waveguide element manufacturing method comprising:
   a first step in which a first clad layer is formed;
   a second step in which a kth core portion is formed on a kth clad layer (k is an integer equal to or larger than 1 and equal to or smaller than n, which is an integer equal to or larger than 2);
   a third step in which a (k+1)th clad layer is formed to cover said kth core portion; and
   a fourth step in which said second step and said third step are repeated alternately n times; and, wherein:
   said third step comprises
      a process in which a source material layer to constitute said kth core portion is formed on said kth clad layer, and
      a process in which said kth core portion is formed by removing any unnecessary portions of said source layer through reactive ion etching.

6. A optical waveguide element manufacturing method, comprising:
   a first step in which a first clad layer is formed;
   a second step in which a kth core portion is formed on a kth clad layer (k is an integer equal to or larger than 1 and equal to or smaller than n which is an integer equal to or larger than 2);
   a third step in which a (k+1)th clad layer is formed to cover said kth core portion; and
   a fourth step in which said second step and said third step are repeated alternately n times; and, wherein:
   said third step comprises
      process in which a source material layer to constitute said kth core portion is formed on said kth clad layer, and
      a process in which said kth core portion is formed by removing any unnecessary portions of said source layer through reactive ion etching; and
      said kth clad layer is formed through chemical vapor deposition.

7. An optical waveguide element according to claim 1, wherein only a portion of each of said core portions is aligned in said common plane.

8. An optical waveguide element according to claim 7, wherein linear core portions of three contiguous light-ware circuit layers are aligned in said common plane with each core portion receiving a respective input signal.

9. An optical waveguide element according to claim 8, wherein the thickness of the respective layers is such that coupling exists only between each of the linear core portions of the outermost two layers and the central layer of the three contiguous layers.

10. An optical waveguide element according to claim 9, wherein: one end of each of the core portions of the outermost two layers exits the element at a respective edge surface of the element to receive a respective input signal and the core portion of the central layer is terminated wholly within the central layer, whereby the aligned linear core portions of the two outermost layers are coupled to each other via the aligned linear core portion of the central layer.

11. An optical wave guide element according to claim 7, wherein one end of each of the core portions of the two contiguous light-wave circuit layers extends to a respective end surface of the element to receive a respective different input light signal at the end surface.

12. An optical wave guide element according to claim 1, wherein one end of each of the core portions of the two contiguous light-wave circuit layers extends to a respective end surface of the element to receive a respective different input light signal at the end surface.

* * * * *